Patented May 22, 1945

2,376,848

UNITED STATES PATENT OFFICE 2,376,848

METHOD OF PRODUCING CRYSTALLINE RENNIN

Cloyce L. Hankinson, Milwaukee, Wis., assignor to Carnation Company, Oconomowoc, Wis., a corporation of Delaware No Drawing. Application August 22, 1942,
Serial No. 455,815

17 Claims. (Cl. 195—66)

This invention relates to the purification of enzymes. More particularly it relates to pure rennin and to a method for preparing the same.

Numerous methods for purifying rennet extracts have been proposed heretofore. The actual purity of the various extracts described in the literature is not easily ascertainable, because the methods employed by the various investigators to determine the increase in activity vary considerably and are not precisely described. There is no evidence, however, that rennin has ever been isolated in pure crystalline form.

It is accordingly an object of the present invention to provide rennin in a pure crystalline form.

Another object is to provide a method for purifying rennin containing extracts.

A further object is to purify rennin containing extracts to the point where the rennin can be crystallized out and to isolate the pure rennin crystals.

Other objects will appear hereinafter.

It has now been found that these objects are accomplished by a purification procedure which involves adjusting the pH of an aqueous rennet extract to a pH in the vicinity of the iso-electric point of the rennin, precipitating the rennin by saturating the solution with a salt, separating the precipitated rennin from the aqueous medium, then dissolving the precipitate in a fresh quantity of water by adjusting the pH to one at which the rennin readily dissolves and repeating the fractionation until a precipitate of satisfactory purity is obtained. In repeating the fractionation after the precipitate has been redissolved, the pH is again adjusted to a pH in the vicinity of the iso-electric point of the rennin, or slightly higher, and the rennin is again precipitated by saturating the solution with salt. The final precipitate is dispersed in water and dialyzed until free from salts.

The dialyzed suspension is then diluted to approximately .05% solids concentration, the pH is adjusted as above to increase the solubility of the rennin, and the liquid is filtered to remove any insoluble foreign material. The resulting solution is then acidified very slowly with dilute acid at a temperature below about 25° C. to the first definite turbidity. Then after allowing the composition to stand for a short time, additional quantities of dilute acid are added slowly until a very heavy white turbidity is obtained. Addition of acid is then discontinued and after the composition has been allowed to stand for several hours, at a temperature below about 25° C., the solid white crystalline material is separated. Additional quantities of crystals may be obtained by further acidifying the supernatant liquid and again separating the crystals. The separated crystals may then be dried.

In order that the invention may be better understood the following examples are included. These examples, however, are intended to be construed as illustrative only and not as limiting the scope of the invention.

Example I

The rennet extract employed as a starting material was a commercial sodium chloride extract of calves' stomachs sold by a laboratory of long stand and high reputation. The extract procedure for making this extract is not known, but a typical analysis shows the following:

|  | Grams per 100 cc. of extract |
|---|---|
| Total solids | 23.65 |
| Sodium chloride | 19.56 |
| Salt free solids | 4.09 |
| Nitrogen | 0.573 |

The H of this rennet extract was initially adjusted to approximately 4.5 with concentrated hydrochloric acid. Sodium chloride was then added to the solution until the latter was saturated, to salt out the rennin. The resulting suspension was centrifuged and the supernatant liquid containing the major portion of impurities (pepsin, soluble protein, non-protein nitrogenous material, inorganic salts) was decanted from the active rennin precipitate. The precipitate was then separated from the remainder of the liquid by centrifuging, after which it was dispersed in a volume of water equal to half the volume of the original rennet extract and dissolved upon adjusting the pH to between 5.7 and 6.0. After the precipitate was dissolved the pH was adjusted to 5.0 and the solution was again saturated with sodium chloride, precipitating the rennin a second time. The fractionation by precipitating the rennin at pH 5.0 from a saturated sodium chloride solution, separating the precipitate from the supernatant liquid by centrifuging, and dissolving the separated precipitate in half the preceding volume at pH 5.7 to 6.0 each time, was repeated until the fourth precipitate was obtained.

The fourth precipitate after separation by centrifuging as described above, was dispersed in water and dialyzed in a Cellophane (regenerated cellulose film) membrane against running distilled water until free from sodium chloride. This required about twenty-four hours. The dialyzed suspension was then diluted to approximately .05% solids concentration and after the pH had been adjusted to 5.7 to 6.0 was filtered with suction to remove any insoluble foreign material. N/10 hydrochloric acid was then added slowly at room temperature to the above solution until the first definite turbidity appeared. The turbid solution was then allowed to stand about ten minutes and enough more N/10 hydrochloric acid to decrease the pH about 0.1 of a unit was added slowly. Addition of acid in about the same quantity was then repeated at approximately ten minute intervals until a heavy white turbidity was obtained and until examination of a drop of the liquid under the microscope showed the presence of many white needle or thread-like crystals. The composition was then allowed to stand for several hours at room temperature, after which the white crystalline material was centrifuged off. The supernatant liquid was further acidified and more crystals were removed until a pH of about 4.5 was reached. The crystals were spread out in a thin layer and dried at low temperature as rapidly as possible.

The activity of the resulting crystalline rennin was determined on a comparative basis by means of a standardized coagulation test involving a ten minute coagulation interval. The crystalline rennin prepared as described above was compared with a commercial rennet extract and with two rennet extracts prepared by different persons according to the procedure outlined in Keil et al. Patent No. 2,145,796. In the standardized coagulation test clotting activity was determined by pipetting 10 ml. portions of fresh raw whole milk into suitable test tubes in a water bath held at 40° C., allowing five minutes to come to temperature, then adding 0.5 ml. of the rennin solution at several dilutions, allowing one-half minute between samples, and recording the coagulation time. For comparing activity of several rennin samples, a final trial was made on all the samples simultaneously, using only the dilutions which gave a clotting time approaching ten minutes in the preliminary trial. Actual coagulation times were estimated by stop watch to the closest five seconds.

The relative activity of each sample was calculated on the basis of the sodium chloride free dry weight necessary to produce coagulation in ten minutes as compared to the standard liquid commercial rennet. This was accomplished by making a total solids determination and subtracting the sodium chloride content determined by titrating an aliquot of solution with standard $AgNO_3$ solution and $K_2CrO_4$ indicator.

The following relative activity comparisons were obtained:

Commercial rennet (salt free)_____ 1.0
Purified rennet (prepared according to the
  method of Keil et al. patent):
    Source (a) _____ 3.3
    Source (b) _____ 3.6
Crystalline rennin (prepared as above)____ 18.0

*Example II*

The procedure was the same as in Example I up through the addition of N/10 hydrochloric acid at room temperature to the first definite turbidity. At this point instead of allowing the composition to stand for ten minutes and adding more acid to decrease the pH about 0.1 unit, the composition was cooled in a refrigerator to 40° F. and slow addition of N/10 hydrochloric acid was then continued until the pH was adjusted to 4.5. After allowing the composition to stand over night it was centrifuged to recover the crystals which had formed. The pH of the supernatant liquid was then adjusted to 4.4 at room temperature, after which this composition was allowed to stand for one hour and centrifuged. The crystals recovered in this step were combined with the crystals previously recovered, and all were spread out in a thin layer and dried at low temperature as rapidly as possible. The crystalline rennin obtained by the procedure of this example exhibited the same potency as that of the crystalline rennin obtained in Example I.

*Example III*

About 200 cc. of the commercial rennet extract employed as a starting material in Example I were dialyzed against five gallons of distilled water at room temperature for twenty-four hours in four small Cellophane (regenerated cellulose film) tubes (about 1¼" in diameter), suspended in a two liter beaker of distilled water. The dialyzed rennet suspension which was substantially salt free was diluted to 0.05% salt free solids concentration and filtered. No adjustment of pH was necessary prior to this latter filtration because the pH of the original rennet extract was 5.7 and this was not changed sufficiently by the dialysis and dilution to require adjustment.

The pH of the filtrate was then adjusted to the first definite turbidity by adding N/10 hydrochloric acid slowly at room temperature. The composition was then cooled in a refrigerator to 40° F., after which the slow addition of N/10 hydrochloric acid was continued until the pH was adjusted to 4.5. After the composition had stood over night the rennin crystals which had separated out were recovered by centrifuging. Additional crystals were obtained by adjusting the pH of the supernatant liquid to 4.4 at room temperature, allowing the composition to stand one hour and centrifuging. These crystals were combined with those first separated and all were dried as described in the preceding examples. The rennin crystals obtained by the method of this example had a potency comparable with that of the crystals obtained by the procedure of Examples I and II. The yield, however, was somewhat less.

As indicated above the detailed procedure set forth in the examples may be varied considerably within the scope of the invention. Thus, although a particular commercial rennet extract was employed in the examples, any commercial rennet extract from calves' stomachs may be used as a starting material. Also any commercial rennet powder serves as a satisfactory starting material in the present process when diluted with a suitable solvent, such as water, preferably in an amount such that the clotting activity of the resulting aqueous composition per unit of volume corresponds to that of commercial liquid rennet extracts. These two materials, that is, commercial rennet extract or commercial rennet powder are the preferred starting materials, because they already represent a partially purified enzyme preparation. Other rennin containing materials, such as fresh or dried whole calves' stomachs or stomach's mucosa may, however, be used as starting material, although these latter have the disadvantage that they require the added step of extraction.

The fractionation by precipitation may also be varied and while it is preferably included, this fractionation may be omitted entirely if desired, as indicated in Example III. Referring particularly to the purification procedure, it may be noted first that although the examples recite that the pH is initially adjusted to 4.5 prior to salting out the rennin and is later adjusted to 5 prior to the salting out, it is not necessary to adhere rigidly to these pH values. Thus, instead of adjusting to 4.5 or 5, the pH may be adjusted to from about 4 to 5 or slightly higher, either initially or in the subsequent precipitations. If too low a pH is used a less efficient separation of impurities from the active rennin results, due to the decreased solubility of impurities at such lower pH, while too high a pH tends to result in greater losses of active material due to the increased solubility of the rennin at such higher pH. With the relatively large volume of water originally present, it is preferable to adjust the pH prior to the first precipitate to 4.5 as described. Due to the substantial decrease in the volume of water as the various precipitations are carried out, it has been found that the decrease in the quantity of solvent decreases the loss of active material at pH 5 sufficiently so that the increased elimination of impurities at this pH more than compensates for the loss of active material. Accordingly the various precipitations after the first are preferably accomplished at pH 5.

As is suggested by the above examples, it is preferable to employ an aqueous medium as the solvent in the present process of purifying rennet extracts. Non-aqueous solvent media may be employed, however, if desired, provided they do not have any harmful effect on the rennin. The aqueous media, moreover, do not necessarily consist of water suitably adjusted in pH and including a salt in solution. For example, instead of water as used above, mixtures of glycerine and water in various proportions may be used, bearing in mind that this introduces another variable which must be taken into account in working out a particular procedure in accordance with the principles described herein.

Although in the above description of the fractionation by precipitation the pH is always adjusted to the precipitation point prior to adding the salt, the invention is not limited to this sequence of operations. Thus the salt may be added either before or after adjusting the pH or partly before and partly afterward. Slightly different results are obtained when the sequence of steps is varied, however, due to different equilibrium conditions. For example, saturating with salt usually lowers the pH 0.1 to 0.2 of a unit. Nevertheless, the order or sequence of steps is not of major importance since there is no apparent advantage which results either from addition of salt first or from adjustment of pH first. The slight difference noted does make it desirable to adopt one standard practice, for example, adjustment of pH first as above, in order to secure reproducible results.

The use of concentrated hydrochloric acid as set forth in Example I above for adjusting the pH initially to 4.5 and in subsequent precipitations to 5 is preferred. It is particularly preferred for the initial adjustment because its high concentration avoids excessive dilution of the rennin extract. These adjustments may, nevertheless, be made with dilute acid instead of concentrated acid, if desired.

The foregoing discussion of the preferred pH at which to carry out the precipitation and possible variations thereof applies where the preferred hydrochloric acid is employed to adjust the pH and where the preferred salt (sodium chloride) is employed to salt out the rennin. It is within the scope of the invention, however, to employ other acids and other salts instead of hydrochloric acid and sodium chloride, although preferably the anion of the acid used will be the same as that of the salt.

Thus, for example, sodium sulphate and ammonium sulphate have both given satisfactory results when substituted for sodium chloride, particularly when they are employed in combination with sulphuric acid for adjusting the pH. For reasons similar to those given above where the pH is to be increased, it is preferable that this be accomplished by adding an alkaline material, the cation of which is the same as the cation of the salt being used, thus sodium hydroxide could be used with sodium chloride.

Where sodium chloride is replaced by another salt or where hydrochloric acid is replaced by another acid, or where both are replaced, it may and usually does become necessary to vary certain of the conditions in order to secure the most satisfactory product, although some crystalline material may result without such variation. The principal features of the procedure which may be varied are the concentration of salt added to produce the precipitate, the concentration of protein material (salt free solids concentration) in the first and subsequent solutions from which the rennin is precipitated, the hydrogen ion concentration at which the rennin is precipitated as well as that at which it redissolved and finally the temperature and time used in carrying out the various precipitations. Investigations of these variables singly to determine the optimum and range for each variable have disclosed that a change in any one variable may change the equilibrium conditions over a rather broad range for one or several of the other variables to secure the most satisfactory results. For example the use of a different salt than sodium chloride may change the optimum salt concentration, protein concentration and pH or hydrogen ion concentration for securing the best results. For example, it is not uncommon for the optimum concentration to be doubled or reduced to one half by such change.

From the foregoing, it is apparent that there are several combinations of the variables specified which yield satisfactory results, but for reproducible results convenient or workable conditions must be chosen for each of the variables in combination with all of the other variables and all must be held constant in repeated practice so that they no longer exists as variables. The detailed procedure set forth above in connection with hydrochloric acid and sodium chloride gives one set of conditions which has been found to be satisfactory. It will be seen that the procedure involves broadly precipitating the rennin with a minimum of impurities by carrying out the precipitation of the rennin in its zone of least solubility, then redissolving the rennin in a solvent medium in which it is soluble and repeating the adjustment of the character of the solvent medium to one where the rennin becomes insoluble and precipitates.

It should be borne in mind in connection with the above that sometimes it is possible to vary one of the variables slightly without changing the others and still obtain satisfactory results, although they may not be optimum. Thus, as set forth above, the pH at which precipitation takes place may vary slightly. Similarly the time of fractionation and the temperature of fractionation may be varied somewhat without greatly affecting the results, although temperatures above about 25° C. are not preferred in connection with the procedure described in detail above involving the use of sodium chloride, hydrochloric acid and precipitation at a pH from 4 to 5. Also the quantity of salt added to precipitate the rennin need not be sufficient to saturate the solution, although saturation is preferable because losses of rennin increase as the percent of saturation is decreased while keeping the other variables constant. In the process described in detail it has been found that a concentration of sodium chloride below one-half saturation is impractical to purify the rennin by precipitation.

While it is preferable to separate the crystalline rennin and the various rennin precipitates from the supernatant liquid or mother liquor by centrifuging, any other desired separation means may be used. For example, separation has been effected satisfactorily by vacuum filtration and by pressure filtration and by gravity separation and decantation of the supernatant liquid. Centrifuging is preferred, however, because it has the advantage of being rapid, resulting in greater recovery of active material and being applicable in commercial operation.

The use of half the preceding volume of water in redissolving each of the successive precipitates is only an approximation and need not be adhered to rigidly. It is, in effect, a control of the protein concentration. Although rigid adherence to this practice is not necessary, approximate adherence is preferable, since too great variations therefrom tend to markedly affect the percentage of impurities eliminated at each precipitation. The use of approximately half the preceding volume of water to redissolve each new precipitate has the advantage that it reduces the volume of material handled in each successive fractionation by half, and the further advantage that greater efficiency of separation of active material from impurities is effected when the volume of water is reduced by half following each precipitation than when one-fourth of the original volume or the total original volume of water is used to redissolve the precipitate.

It will be noted that the above examples indicate that the precipitates are caused to redissolve in water by adjusting the pH to from 5.7 to 6. As the statement itself indicates, this adjustment of pH need not be exact, and if desired other means of causing the rennin to be redissolved which do not involve introduction of undesired materials may be used. Since the rennin precipitates at pH 5, it will be apparent, however, that at any pH considerably less than 5.7 the solubility of the rennin will not be very great. Also it is dangerous to increase the pH of the rennin very much above 6, since rennin is decomposed at pH 7. Thus while some variation from pH 5.7 to 6, in the medium in which the rennin is redissolved, is possible, it will be apparent that this variation is necessarily slight, assuming that other variables remain constant.

The number of times the precipitation of the rennin is repeated may also be varied considerably within the scope of the invention, and, in fact, as indicated in Example III the purification by precipitation may be omitted entirely, although as pointed out, this has certain disadvantages, such as that the yield is materially decreased as compared to that obtained by the preferred procedure. More particularly, it is not essential to follow the purification procedure until the fourth precipitate is obtained, although this is preferred. Crystalline rennin has been obtained where the purification procedure was interrupted prior to the fourth precipitate. Such less highly purified precipitates, however, present greater difficulty in the crystallization procedure than with the more highly purified material. The precipitation may also be carried beyond the fourth precipitate, but the resulting losses of rennin usually tend to overbalance any increase in purity.

In contrast to many of the features which have been discussed hereinbefore, the dialysis treatment or some equivalent treatment is highly important prior to the crystallization procedure. The dialysis serves to remove the last traces of non-protein nitrogen impurities which tend to prevent crystallization, even when present in traces only, and it also serves to reduce the salt concentration to a minimum, thereby approaching the zone of insolubility of the enzyme in aqueous solution and allowing it to crystallize. Nevertheless, the time during which the dialysis is continued and other factors affecting its rate, such as the rate at which the water is supplied, may be varied considerably. The dialysis is preferably carried out under the conditions specified above and is preferably continued until the rennin is substantially salt free, although not necessarily absolutely salt free. The residual salt is determined by titrating with a standard silver nitrate solution using potassium chromate as an indicator, and is deducted from the total solids to arrive at the salt free solids concentration. Other membranes may be employed in place of Cellophane as the dialyzer, for example, viscose sausage casings have been used, and, in general, any membrane may be used which will retain the rennin but will allow inorganic salts and low molecular weight organic impurities to dialyze through.

The various details of the crystallization procedure are also of very considerable importance. The dilution of the dialyzed rennet suspension to .05% solids concentration is only an approximation, however, the optimum working zone for the conditions described above varying from .02% to .10%. The concentration of solids may, therefore, be varied somewhat from the .05% given in the examples bearing in mind that too high a solids concentration tends to promote the precipitation of amorphous rather than crystalline rennin. On the other hand, the limiting factor with lower concentrations is the loss of active material in the supernatant liquid.

Following the dilution of the dialyzed suspension and adjustment of the pH to increase the solubility of the rennin and the subsequent filtration to remove insoluble material, it is preferable to add a preservative, such as toluene, if considerable time is to be consumed in carrying out the purification and crystallization procedure at room temperatures. Where the crystallization procedure is to be carried out immediately, however, the addition of toluene is not preferred.

In addition to too great solids content other conditions of the crystallization procedure which tend to result in the precipitation of amorphous material are too rapid addition of acid, insufficient purification prior to crystallization, and room temperatures greater than 25° C. Too rapid addition of acid can be avoided by adding the acid in the form of a highly dilute solution and/or by adding the acid solution in small quantities at a time. The exact dilution of the acid is not critical and some variation from N/10 is possible, although N/10 acid has been found preferable because it is a good compromise between strong acid, which tends to result in too rapid addition, and extremely weak acid, which tends to increase the dilution of the rennin substantially. The use of hydrochloric acid to adjust the pH during crystallization procedure is preferred, regardless of the acid used during purification, since any salts present are eliminated in the dialysis. Other acids, for example, sulphuric, may, however, be used in the crystallization procedure as well as in the purification.

Whereas temperatures above about 25° C. are unfavorable to the recovery of the maximum yield of pure crystalline rennin, temperatures substantially below 25° C. are favorable to a high yield of crystalline rennin. It has been found, however, that reduction of the temperature substantially below room temperature does not effect a sufficient improvement in results over those at room temperature to warrant resorting to this expedient. Use of such low temperatures is within the scope of the invention, however, as indicated by Example II.

In reducing the pH of the rennin solution during the crystallization procedure, the exact manner in which the acid is added, that is the quantity added at any particular time and whether or not the additions are interrupted and the time allowed between additions of acid may be varied considerably within the scope of the invention, as will be apparent from Examples I and II above. In general, the more the pH is decreased after the formation of the first crystals, the greater the danger of precipitating amorphous material, whereas the addition of too little acid prior to separation of the crystals tends to result in a decreased yield, at least in the first batch of crystals isolated. Interrupting the additions of the acid has the advantage of allowing the system to come to equilibrium, which in turn assists in avoiding the addition of too much acid prior to the separation of the crystals. After the first batch of crystals is removed another quantity may be obtained by still further lowering the pH. However, if this lowering of the pH is continued much beyond 4.4 at room temperature the solubility of the rennin becomes greater due to departure from the isoelectric condition so that further crystallization does not result.

It is preferable to spread the crystals out in a thin layer and dry at low temperatures as rapidly as possible after they have been separated in order to avoid decomposition with resulting decrease in yield. Recrystallization may be carried out, by repeating the crystallization procedure, but this has been found to be unnecessary because of losses of active material with no further increase in activity per unit weight.

One of the outstanding advantages of this invention is that it provides rennin in a pure crystalline form for the first time and provides means for preparing such pure crystalline rennin in any desired quantity. The invention still further provides an improved means for purifying the rennin prior to the crystallization procedure, whereby the crystallization is made possible. In order to secure any crystalline rennin at all by the crystallization procedure, it is necessary that the rennet extract be previously purified to a relatively high degree. It is believed that the failure of others to crystallize rennin heretofore is in a large part due to a failure to obtain a sufficient degree of purification, such as is possible by the procedure described herein. From the chemical standpoint the crystalline rennin obtained in accordance with this invention is the most pure rennin attainable and as a consequence of this freedom from impurities, some of which tend to destroy rennin, the crystalline form may be more readily preserved over long periods without losses of active material.

Although it is possible to obtain crystalline rennin by the method of Example III, which has a potency comparable to that obtained by the method described in Examples I and II, the methods of Examples I and II possess certain advantages over that of Example III. One important advantage is that the methods of Examples I and II do not require the dialysis of such large quantities of liquid as is necessary in Example III. The dialysis of large quantities of liquid commercially is not particularly practical. Furthermore, the enzyme pepsin which is present in rennet extracts, as well as bacteria and yeast, which are also present, have less opportunity to act and destroy a part of the rennin under the conditions of Examples I and II than they do under those of Example III. Little or none of the rennin is destroyed by pepsin or by bacteria and yeast in the process of Examples I and II. Because the conditions during dialysis, namely room temperature and lower salt concentration, are favorable to the destruction of rennin by bacteria and yeast, it is highly desirable to remove as much as possible of these materials prior to dialysis as in the method of Examples I and II. Lastly, the methods of Examples I and II give higher yields of crystalline rennin than does that of Example III. This is largely due to the fact that the purification of the rennin by the method of Examples I and II is much more complete than by the method of Example III.

The increased activity which results from the purification and crystallization procedure described herein is evidenced by the data given in Example I, comparing the activity of crystalline rennin with various rennin compositions. Although rennin activities as given in the art do not generally furnish any satisfactory basis for comparing two different rennin compositions, because the methods for determining activity either are not given or differ in important respects, the comparative activities set forth in Example I are highly indicative, because the basis for activity comparison was per unit weight of salt-free dry substance and because exactly the same procedure was used to determined the activity of each of the rennin compositions mentioned. Other advantages of the invention will be obvious to those skilled in the art.

It is apparent that many widely different embodiments of this invention may be made without departing from the spirit and scope thereof and, therefore, it is not intended to be limited except as indicated in the appended claims.

I claim:

1. The method of preparing pure crystalline rennin which comprises slowly reducing the pH of a solution of about .02% to about 10% by weight, on a dry solids basis, of a highly purified and substantially salt free rennin material in an aqueous medium having a pH substantially greater than 5, continuing such slow reduction of the pH until the rennin crystallizes out and then separating the crystalline rennin from the mother liquor.

2. The method of preparing pure crystalline rennin which comprises slowly reducing the pH of a solution of about .02% to about .10%, by weight, on a dry solids basis, of a highly purified and substantially salt free rennin material in an aqueous medium having a pH substantially greater than 5, continuing such slow reduction of the pH until the rennin crystallizes out and then separating the crystalline rennin from the mother liquor, said rennin solution being maintained at a temperature below about 25° C. following the addition of a substantial quantity of acid until the crystalline rennin has been separated therefrom.

3. The method of preparing pure crystalline rennin which comprises preparing a composition comprising about .02% to about .10%, by weight, on a dry solids basis of a highly purified and substantially salt free rennin material in water, then with the pH of the composition at about 5.7 to 6.0 separating any solid material present, thereafter slowly adding acid until the rennin crystallizes out and then separating the crystalline rennin from the mother liquor.

4. The method of preparing pure crystalline rennin which comprises dialyzing an aqueous composition comprising an at least partially purified rennin containing material against water until such aqueous composition is substantially salt free, adjusting such dialyzed aqueous composition to a solution of about .02% to about .10%, by weight, on a dry solids basis of a highly purified, substantially salt free rennin material in a medium having a pH substantially greater than 5, then slowly reducing the pH of said solution until the rennin crystallizes out and separating the crystalline rennin from the mother liquor.

5. The method of preparing pure crystalline rennin which comprises dialyzing an aqueous composition comprising an at least partially purified rennin containing material against water until such aqueous composition is substantially salt free, adjusting the concentration of such dialyzed aqueous composition to about .02% to about .10%, by weight, on a dry solids basis, of a highly purified substantially salt free rennin material, adjusting the pH to from about pH 5.7 to about pH 6.0, then separating any undissolved solid material, thereafter slowly adding acid until the rennin crystallizes out and then separating the crystalline rennin from the mother liquor.

6. The method of preparing pure crystalline rennin which comprises dialyzing an aqueous composition comprising an at least partially purified rennin containing material against water until such aqueous composition is substantially salt free, adjusting the concentration of such dialyzed aqueous composition to about .02% to about .10%, by weight, on a dry solids basis of a highly purified substantially salt free rennin material, adjusting the pH to from about Ph 5.7 to about pH 6.0, then separating any undissolved solid material, thereafter slowly adding dilute hydrochloric acid until the rennin crystallizes out and then separating the crystalline rennin from the mother liquor.

7. The method of preparing pure crystalline rennin which comprises slowly reducing the pH of a solution of about .02% to about .10% by weight, on a dry solids basis, of a highly purified and substantially salt free rennin material in an aqueous medium having a pH substantially greater than 5, continuing such slow reduction of the pH until the first definite turbidity is obtained, then interrupting the reduction of the pH until equilibrium is attained, then continuing the slow reduction of the pH until additional quantities of rennin crystallize out and finally separating the crystalline rennin from the mother liquor.

8. The method of preparing pure crystalline rennin which comprises slowly reducing the pH of a solution of about .02% to about .10%, by weight, on a dry solids basis of a highly purified and substantially salt free rennin material in an aqueous medium having a pH substantially greater than 5, continuing such slow reduction of the pH until the first definite turbidity is obtained, then interrupting the reduction of the pH until equilibrium is attained, then continuing the slow reduction of the pH until additional quantities of rennin crystallize out and a heavy white turbidity is obtained and finally, after the composition has again come to equilibrium, separating the crystalline rennin from the mother liquor.

9. The method of preparing pure crystalline rennin which comprises dialyzing an aqueous composition comprising an at least partially purified rennin containing material in a regenerated cellulose membrane against water until such aqueous composition is substantially salt free, adjusting the concentration of such dialyzed aqueous composition to about .02% to about .10%, by weight, on a dry solids basis, of a highly purified substantially salt free rennin material, adjusting the pH to from about pH 5.7 to about pH 6.0, then separating any undissolved solid material, thereafter slowly adding acid until the rennin crystallizes out and then separating the crystalline rennin from the mother liquor.

10. A method of purifying a rennin extract comprising rennin dissolved in an aqueous medium, which comprises precipitating the rennin from a saturated salt solution at a pH between about pH 4 and about pH 5, separating the precipitate and redissolving it in an aqueous medium having about half the volume of the medium from which the precipitate was obtained and repeating the precipitation of the rennin from the saturated salt solution at a pH between about pH 4 and about pH 5, the separation of the precipitate and the redissolving of it in an aqueous medium having about half the volume of that from which the precipitate was obtained until a rennin precipitate of the desired purity is obtained.

11. The method of preparing pure crystalline rennin from a rennin extract comprising rennin dissolved in an aqueous medium which comprises precipitating the rennin from a salt solution at a pH between about pH 4 and about pH 5, separating the precipitate and redissolving it in an aqueous medium and repeating the precipitation of the rennin from salt solution at a pH between about pH 4 and about pH 5, the separation of the precipitate and the redissolving of it until a rennin precipitate of the desired purity is obtained, then distributing the precipitate in water and dialyzing the resulting aqueous composition against water until it is substantially salt free, adjusting such dialyzed aqueous composition to a solution of about .02% to about .10%, by weight, on a dry solids basis, of a highly purified substantially salt free rennin material, then slowly reducing the pH of said solution until the rennin crystallizes out and separating the crystalline rennin from the mother liquor.

12. A method of preparing pure crystalline rennin which comprises adjusting the pH on a rennet extract to approximately 4.5 with hydrochloric acid, then adding sodium chloride to the solution until it is saturated, separating the resulting precipitate and dispersing it in a quantity of water having a volume roughly equal to half of the volume of the original rennet extract, adjusting the pH to a pH from about 5.7 to about 6.0 to dissolve the rennin and repeating the precipitation and redissolving of the precipitate until the fourth precipitate is obtained, precipitating at about pH 5.0 from saturated sodium chloride solution and redissolving the precipitate in half the preceding volume at a pH from about 5.7 to about 6.0 each time, dispersing the fourth precipitate in water and dialyzing it in a regenerated cellulose membrane against water until it is substantially free from sodium chloride, diluting the dialyzed suspension to about .02% to about .10% solids concentration, adjusting the pH to a pH from about 5.7 to about 6.0, filtering to remove any insoluble material, adjusting the pH on the filtered solution with approximately N/10 hydrochloric acid slowly at room temperature to the first definite turbidity, interrupting the addition of acid to permit the composition to come to equilibrium and after equilibrium is attained continuing the slow addition of said hydrochloric acid until a heavy white turbidity is obtained, then after the composition has again come to equilibrium separating the crystalline rennin from the mother liquor.

13. The method of preparing pure crystalline rennin from a rennin extract comprising rennin dissolved in an aqueous medium which comprises precipitating the rennin from a salt solution at a pH between about pH 4 and about pH 5, separating the precipitate, distributing the precipitate in water and dialyzing the resulting aqueous composition against water until it is substantially salt free, adjusting such dialyzed aqueous composition to a solution of about .02% to about .10%, by weight, on a dry solids basis, of a highly purified substantially salt free rennin material, then slowly reducing the pH of said solution until the rennin crystallizes out and separating the crystalline rennin from the mother liquor.

14. The method of preparing pure crystalline rennin from a rennin extract comprising rennin dissolved in an aqueous medium which comprises precipitating the rennin from a salt solution at a pH between about pH 4 and about pH 5, separating the precipitate and redissolving it in an aqueous medium and repeating the precipitation of the rennin from salt solution at a pH between about pH 4 and about pH 5, the separation of the precipitate and the redissolving it until a rennin precipitate of the desired purity is obtained, then distributing the precipitate in water and dialyzing the resulting aqueous composition against water until it is substantially salt free, adjusting such dialyzed aqueous composition to a solution of about .02% to about .10%, by weight, on a dry solids basis, of a highly purified substantially salt free rennin material, adjusting the pH to a pH from about 5.7 to about 6.0, separating any solid material present, then slowly reducing the pH of said solution until the rennin crystallizes out and separating the crystalline rennin from the mother liquor.

15. A method of purifying a rennin extract comprising rennin dissolved in an aqueous medium, which comprises precipitating the rennin from a salt solution at a pH between about pH 4 and about pH 5, separating the precipitate and redissolving it in an aqueous medium having about half the volume of the medium from which the precipitate was obtained and repeating the precipitation of the rennin from the salt solution at a pH between about pH 4 and about pH 5, the separation of the precipitate and the redissolving of it in an aqueous medium having about half the volume of that from which the precipitate was obtained until a rennin precipitate of the desired purity is obtained.

16. A method of purifying a rennin extract comprising rennin dissolved in an aqueous medium, which comprises precipitating the rennin from a salt solution at a pH between about pH 4 and about pH 5, separating the precipitate and redissolving it in an aqueous medium having about half the volume of the medium from which the precipitate was obtained and repeating the precipitation of the rennin from the salt solution at a pH between about pH 4 and about pH 5, the separation of the precipitate and the redissolving of it in an aqueous medium having about half the volume of that from which the precipitate was obtained until a rennin precipitate of the desired purity is obtained, then distributing the precipitate in water and dialyzing the resulting aqueous composition against water until it is substantially salt free.

17. A method of purifying a rennin extract comprising rennin dissolved in an aqueous medium, which comprises precipitating the rennin from a salt solution at a pH between about pH 4 and about pH 5, separating the precipitate and redissolving it in an aqueous medium having about half the volume of the medium from which the precipitate was obtained by adjusting the pH of the medium in which the precipitate is to be dissolved to a pH of about pH 5.7 to about pH 6 and repeating the precipitation of the rennin from the salt solution at a pH between about pH 4 and about pH 5, the separation of the precipitate and the redissolving of it in an aqueous medium having about half the volume of that from which the precipitate was obtained until a rennin precipitate of the desired purity is obtained.

CLOYCE L. HANKINSON.

CERTIFICATE OF CORRECTION.

Patent No. 2,376,848. May 22, 1945.

CLOYCE L. HANKINSON.

It is hereby certified that error appears in the printed specification of the above numbered patent requiring correction as follows: Page 1, second column, line 15, Example I, for "extract" read --exact--; line 26, for "The H" read --The pH--; page 4, second column, line 20, for "last" read --least--; page 5, second column, line 70, claim 1, for "10%" read --.10%--; and that the said Letters Patent should be read with this correction therein that the same may conform to the record of the case in the Patent Office.

Signed and sealed this 25th day of December, A. D. 1945.

Leslie Frazer (Seal)  First Assistant Commissioner of Patents.